United States Patent
Burgess et al.

(10) Patent No.: US 10,053,362 B2
(45) Date of Patent: Aug. 21, 2018

(54) GAS-LOADING AND PACKAGING METHOD AND APPARATUS

(71) Applicant: IH IP Holdings Limited, St. Helier (GB)

(72) Inventors: Darren R. Burgess, Charlotte, NC (US); Michael Raymond Greenwald, Indian Trail, NC (US); Brent W. Barbee, Stanfield, NC (US)

(73) Assignee: IH IP Holdings Limited, St. Helier (JE)

(*) Notice: Subject to any disclaimer, the term of this patent is extended or adjusted under 35 U.S.C. 154(b) by 0 days.

(21) Appl. No.: 15/615,137

(22) Filed: Jun. 6, 2017

(65) Prior Publication Data

US 2018/0194624 A1    Jul. 12, 2018

Related U.S. Application Data

(60) Provisional application No. 62/346,238, filed on Jun. 6, 2016.

(51) Int. Cl.
| | |
|---|---|
| *C01B 3/08* | (2006.01) |
| *H01M 8/0612* | (2016.01) |
| *H01M 8/04089* | (2016.01) |
| *H01M 8/04119* | (2016.01) |
| *C01B 3/10* | (2006.01) |

(52) U.S. Cl.
CPC ........... *C01B 3/08* (2013.01); *H01M 8/04089* (2013.01); *H01M 8/04119* (2013.01); *H01M 8/0643* (2013.01); *C01B 3/10* (2013.01); *Y02E 60/362* (2013.01)

(58) Field of Classification Search
CPC ... C01B 3/0005; C01B 3/0078; C01B 3/0084; F17C 11/005; F17C 5/06
See application file for complete search history.

(56) References Cited

PUBLICATIONS

Strobel et al. "Hydrogen adsorption on carbon materials" (1999) Journal of Power Sources 84 , 221-224.*

* cited by examiner

*Primary Examiner* — Amber R Orlando
*Assistant Examiner* — Syed T Iqbal
(74) *Attorney, Agent, or Firm* — NK Patent Law, PLLC (57) ABSTRACT

A gas-loading and packaging system is provided for loading a solid material used in a hydrogen fuel cell with gas and packaging the solid material in a sealed container. The gas may comprise a hydrogen gas or other gas. The solid material may, for example, comprise palladium, a nickel alloy, platinum, or other metal. The solid material is loaded with gas by exposing the solid material to the gas under high pressure. When the solid material is exposed to gas under pressure, the gas absorbs into or adsorbs onto the solid material. The mass of the solid material is continuously monitored and used to determine when the solid material is loaded with the desired amount of gas. After the solid material is loaded with gas, high pressure is maintained while the solid material is packaged in a sealed container that is capable of retaining the high pressure gas.

16 Claims, 14 Drawing Sheets

GAS-LOADING AND PACKAGING METHOD AND APPARATUS

CROSS-REFERENCE TO RELATED APPLICATION

This application claims the benefit of priority of U.S. Provisional Patent Application No. 62/346,238, titled "GAS-LOADING AND PACKAGING METHOD AND APPARATUS" filed on Jun. 6, 2016 which is incorporated herein in its entirety by this reference.

TECHNICAL FIELD

The present disclosure relates generally to alternative energy technologies and, more particularly, to methods and apparatus for gas-loading and packaging solid materials for use in hydrogen fuel cells and low-energy nuclear reactions (LENRs).

BACKGROUND

The loading of hydrogen (or its isotopes) into a solid material is an important technology for hydrogen fuel cells and low energy nuclear reactors. A hydrogen loading ratio in palladium above 0.8 is widely believed to be a necessary condition to produce a LENR. High loading of hydrogen into a fuel cell compatible material increases the life of the fuel cell. The loading of methane into metal-organic frameworks is an important, emerging technology to increase the storage capacity of this fuel source. In each of these scenarios, the loading process must be controllable, quantifiable and sustainable to be repeatable and production-worthy.

Several techniques are known for measuring the amount of hydrogen that is loaded into a solid material. The amount of hydrogen loaded into a solid material can be quantified by measuring an increase in a sample's mass or a decrease in pressure of a fixed quantity of gas in the presence of the material.

Measuring the pressure decrease in a fixed quantity of gas suffers from one major source of error. The gas may adsorb on all surfaces present in addition to the material of interest. Also, the existing technologies do not allow for the hydrogen load to be sustained after quantification. For high purity, homogeneous materials this does not necessarily present a problem because sample of the same material may be used in other processes. In the case of multi-component materials such as layered thin films, nano-particles, or temperature sensitive alloys, sample-to-sample variability can be considerable creating a need to characterize materials for fuel cell or LENR use.

SUMMARY

The present disclosure describes a method and apparatus for loading a solid material with a gas and packaging the solid material in a sealed container. The solid material is placed in a chamber with a controlled environment. The environment may be a vacuum, hydrogen or one of its isotopes, or any other gas of interest. The loading of a gas into or onto a solid material is quantified by measuring the solid material's increase in mass. The loaded material is transferred to a second chamber where it is packaged while maintaining the loading gas atmosphere and pressure.

DETAILED DESCRIPTION

Figure 1:
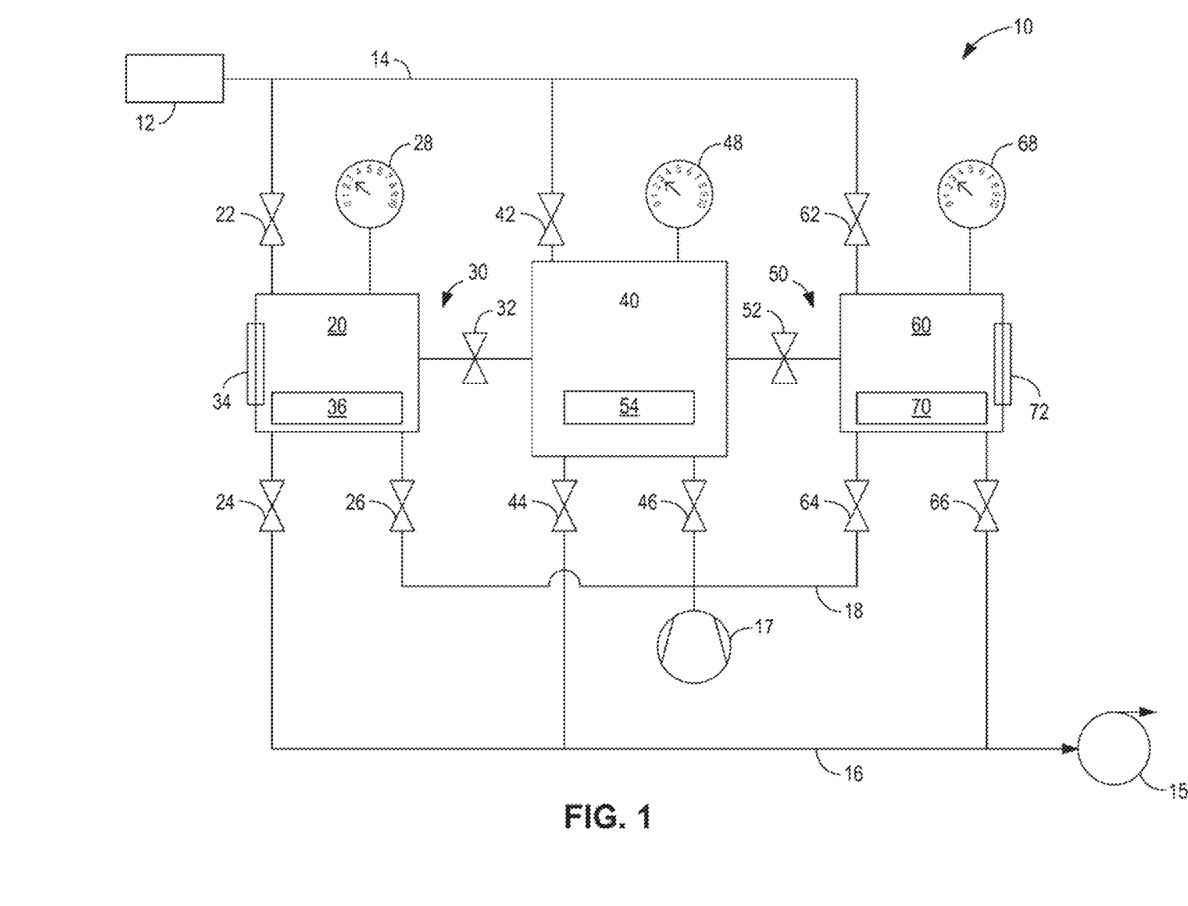
FIG. 1 is a schematic diagram illustrating a system for gas-loading and packaging a solid material.

Referring now to the drawings, FIG. 1 illustrates an exemplary gas-loading and packaging system 10 according to one exemplary embodiment. The main function of the gas-loading and packaging system 10 is to load a solid material used in a hydrogen fuel cell or LENR with gas and package the solid material. The gas may comprise a hydrogen gas or other gas. As used herein, the term hydrogen gas includes all gaseous isotopes of hydrogen including deuterium and tritium. The solid material may, for example, comprise palladium, a nickel alloy, platinum, or other metal. The solid material is loaded with gas by exposing the solid material to the gas under high pressure. When the solid material is exposed to gas under pressure, the gas absorbs into or adsorbs onto the solid material. After the solid material is loaded with gas, the gas atmosphere and high pressure are maintained while the solid material is packaged in a sealed container that is capable of retaining the high pressure gas.

In the following description, an exemplary embodiment is described for loading a solid material such as palladium with hydrogen gas. Those skilled in the art will appreciate that similar procedures may be used for loading the solid material with other gases.

The main functional components of the gas-loading and packaging system 10 comprise a gas source 12, rough/backing pump 15, turbo-molecular pump 17, sample loading chamber 20, process chamber 40, and packaging chamber 60. The gas source 12 connects via gas supply line 14 to the sample loading chamber 20, process chamber 40, and packaging chamber 60. Control valves 22, 42, and 62 control the flow of gas from the gas source 12 into the sample loading chamber 20, process chamber 40, and packaging chamber 60 respectively. The rough/backing pump 15 connects via vacuum line 16 to the sample loading chamber 20, process chamber 40, and packaging chamber 60. Control valves 24, 44, and 66 connect/disconnect the sample loading chamber 20, process chamber 40, and packaging chamber 60 respectively from the rough/backing pump 15. The turbo-molecular pump 17 connects via vacuum line 18 to the sample loading chamber 20, process chamber 40, and packaging chamber 60. Control valves 26, 46, and 64 connect/disconnect the sample loading chamber 20, process chamber 40, and packaging chamber 60 respectively from the turbo-molecular pump 17.

The sample loading chamber 20 is the point of entry where the solid material is initially introduced into the gas-loading and packaging system 10. The sample loading chamber 20 includes a door 34 through which a solid material is placed inside the sample loading chamber 20. When closed, the door 34 forms a seal that is capable of holding pressure or vacuum inside the sample loading chamber 20. A pressure gauge 28 measures the gas pressure inside the sample loading chamber 20. A linear transfer apparatus 36 is disposed inside the sample loading chamber 20 for transferring the solid material from the sample loading chamber 20 to the process chamber 40 as hereinafter described in greater detail.

The sample loading chamber 20 is connected to the process chamber 40 by a sealed passageway 30 including a gate valve 32 for isolating the sample loading chamber from the process chamber 40, and vice versa. The passageway 30 and gate valve 32 are sized to allow the transfer of the solid material from the sample loading chamber 20 to the process chamber 40 while maintaining the gas atmosphere and high gas pressure.

The process chamber 40 is where the solid material is exposed to and loaded with hydrogen gas. A pressure gauge 48 measures the gas pressure inside the process chamber 40. A scale 54 inside the process chamber 40 continuously measures the mass of the solid material while the solid material is in the process of being loaded with hydrogen gas. As described in more detail below, the measurements of the mass of the solid material are used to determine when the solid material is loaded with a desired amount of hydrogen gas. Measurements of the mass of the solid material may be made when the solid material is initially placed in the process chamber 40 to determine the starting mass of the solid material and at predetermined or periodic time intervals during the loading of gas into the solid material to determine the change in mass of the solid material. The measurements may continue until the predetermined amount of gas is loaded into the solid material.

The process chamber 40 is connected to the packaging chamber 60 by a sealed passageway 50 including a gate valve 52 for isolating the process chamber 40 from the packaging chamber 60, and vice versa. The passageway 50 and gate valve 52 are sized to allow the transfer of the solid material from the process chamber 40 to the packaging chamber 60 while maintaining the gas atmosphere and high gas pressure.

The packaging chamber 60 is where the solid material loaded with hydrogen gas is packaged in a sealed container. A pressure gauge 68 measures the gas pressure inside the packaging chamber 60. The packaging chamber 60 includes a door 72 through which the sealed container containing the solid material is removed from the gas loading and packaging system 10. When closed, the door 34 forms a seal that is capable of holding pressure or vacuum inside the packaging chamber 60. A linear transfer apparatus 70 is disposed inside the packaging chamber 60. The linear transfer apparatus is used to transfer the solid material after it is loaded with hydrogen gas from the process chamber 40 to the packaging chamber 60.

The operation of the gas loading and packaging system 10 can be broken down into five processes: an intake process, a first transfer process, a gas loading process, a second transfer process, and a packaging process. During the intake process, a sample of solid material, e.g. palladium, is placed inside the sample loading chamber 20. The sample loading chamber 20 is evacuated to remove contaminants. Once the contaminants are removed, the sample loading chamber 20 is pressurized to about 760 Torr, which is one atmosphere. At this point, the intake process ends and the first transfer process begins, during which the solid material is transferred from the sample loading chamber 20 to the process chamber 40.

During the first transfer process, the pressure in the process chamber is raised to about 10 Torr to 50 Torr above the sample loading chamber pressure. The higher pressure in the process chamber 40 relative to the sample loading chamber 20 serves to minimize the flow of any contaminants from the sample loading chamber 20 to the process chamber 40 during the transfer of the solid material. The gate valve 32 isolating the sample loading chamber 20 is then opened and the linear transfer apparatus 36 transfers the sample of solid material into the process chamber 40 and places the sample on the scale 54. The linear transfer apparatus 36 may comprise a retractable arm that picks up the solid material, extends into the process chamber 40 and deposits the solid material on the scale 54, and then retracts back into the sample loading chamber 20. When the transfer of the solid material is complete, the gate valve 32 is closed. At this point, the first transfer process ends and the gas loading process begins, during which the solid material is loaded with hydrogen gas.

At the start of the hydrogen loading process, both gate valves 32 and 52 are closed to isolate the process chamber 40. The process chamber pressure is increased to a pressure in the range of about 3800 Torr to about 7600 Torr. When the solid material is exposed to hydrogen gas under high pressure, hydrogen gas is absorbed into and adsorbed onto the solid material. The amount of hydrogen gas loaded onto the solid material, by absorption and/or adsorption, is determined by the change of mass of the solid material. The change of mass of the solid material is related to the amount of hydrogen by:

$$L = \frac{\Delta m}{9.50 \times 10^{-3} P}$$

where L is the loading ratio of atoms of hydrogen to atoms of palladium, $\Delta m$ is the change in mass of the palladium sample in grams, and P is the mass of the palladium sample in grams.

The mass of the solid material is continuously or periodically checked during the gas loading process to determine when the solid material is loaded with a desired amount of hydrogen gas. In one embodiment, the change of mass is calculated and compared to a pre-computed mass change threshold to determine when the solid material is loaded with a desired amount of hydrogen gas. In other embodiments, the amount of hydrogen gas loaded onto the solid material is computed according to Equation 1. The gas loading process ends when the change of mass reaches the threshold, or when the calculated amount of hydrogen gas loaded onto the solid material equals the desired amount.

Once the solid material is loaded with a desired amount of hydrogen gas, the second transfer process begins. During the second transfer process, the pressure inside the packaging chamber is raised to about 10 Torr to about 50 Torr below the process chamber pressure and the gate valve 52 is opened. The lower pressurization of the packaging chamber 60 relative to the process chamber 40 serves to minimize the flow of any contaminants from the packaging chamber 60 to the process chamber 40 since the packaging chamber 60 is opened to the atmosphere to remove the sample. The linear transfer apparatus 70 in the packaging chamber 60 transfers the solid material loaded with hydrogen gas from the process chamber 40 into the packaging 60. The linear transfer apparatus 70 may comprise a retractable arm that extends into the process chamber 40, picks up the solid material, and then retracts back into the packaging chamber 60. After the solid material is transferred into the packaging chamber 60, the gate valve 52 is closed to isolate the packaging chamber 60. At this point the second transfer process ends and the packaging process begins.

It is assumed that a sealed container is placed inside the packaging chamber 60 prior to the start of the packaging process. The sealed container may be introduced into the packaging chamber 60 anytime before the start of the second transfer process. Prior to the start of the packaging process, the packaging chamber 60 may be evacuated to remove contaminants. In one embodiment, the packaging chamber 60 is outfitted with vacuum/high pressure mechanical arms or other accessories as needed to transfer the solid material sample into a container that is capable of maintaining the process gas at the process pressure. In another embodiment, the packaging chamber 60 may comprise a glove box that enables a human user to handle and package the solid material. After sealing the container, the packaging chamber 60 may be evacuated to atmospheric pressure, nominally 760 Torr (101 kPa). The door 72 to the packaging chamber 60 is then opened and the packaged solid material sample is removed. The packaging enables the solid material sample to maintain the incorporated gas, maximizing its usefulness in application and longevity.

The following is a more detailed, step-by-step description of the gas loading and packaging process. FIGS. 2A-2J illustrate some of these steps.

Figure 2A:
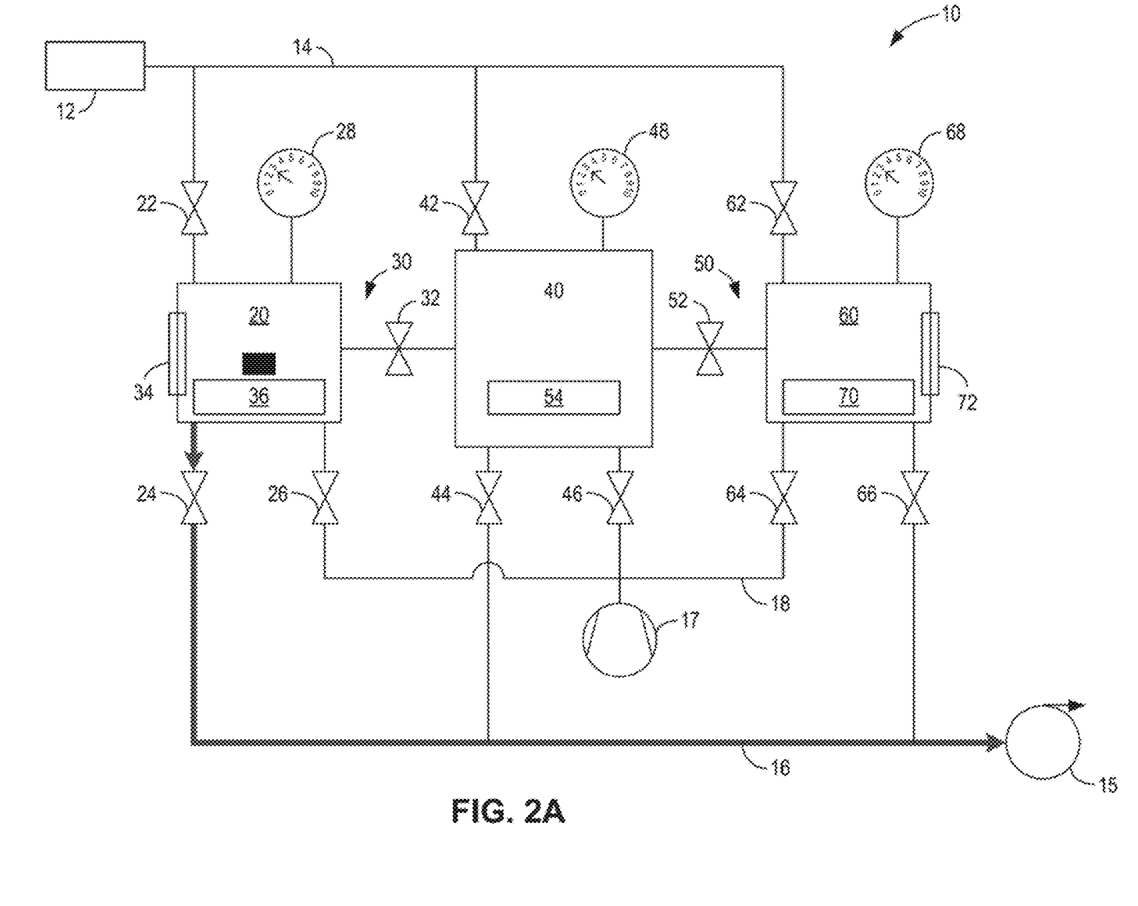
FIGS. 2A-2C illustrate an intake process during which the sample loading chamber of the gas-loading and packaging system is evacuated and then pressurized.
Figure 2B:
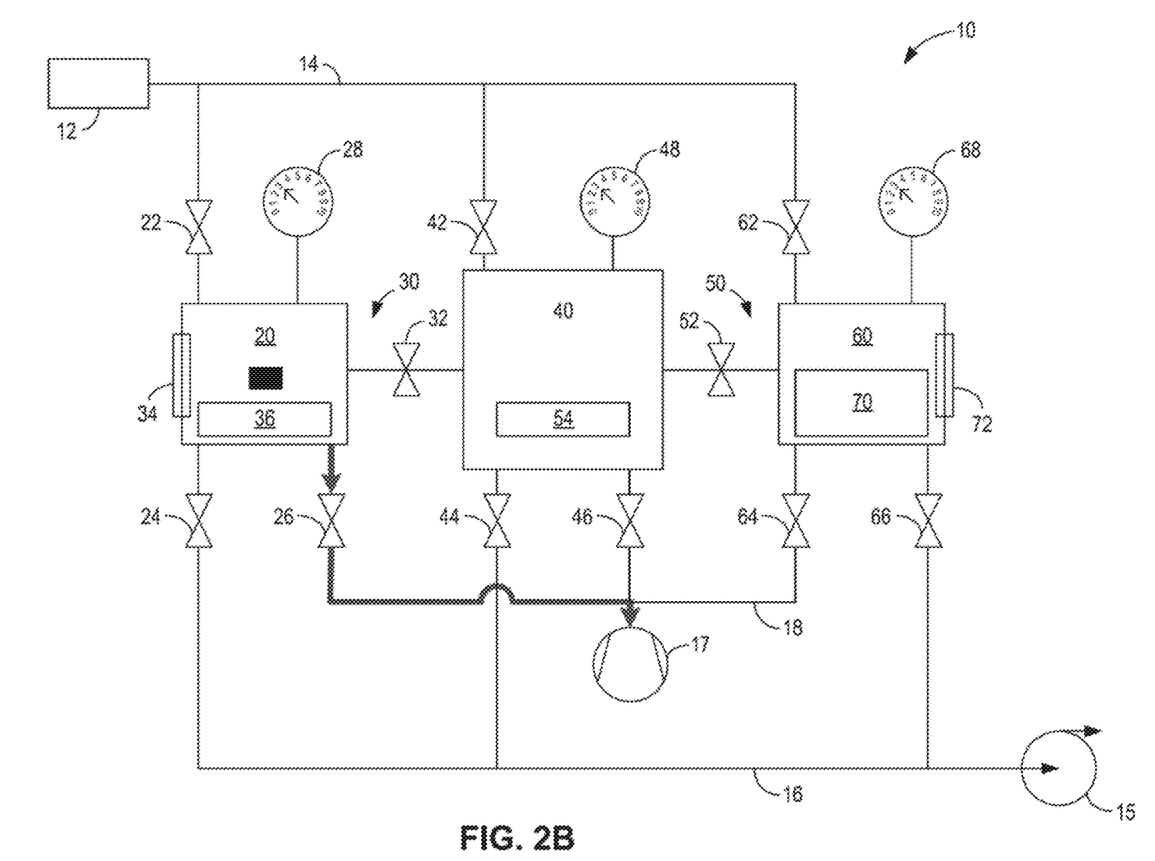
Figure 2C:
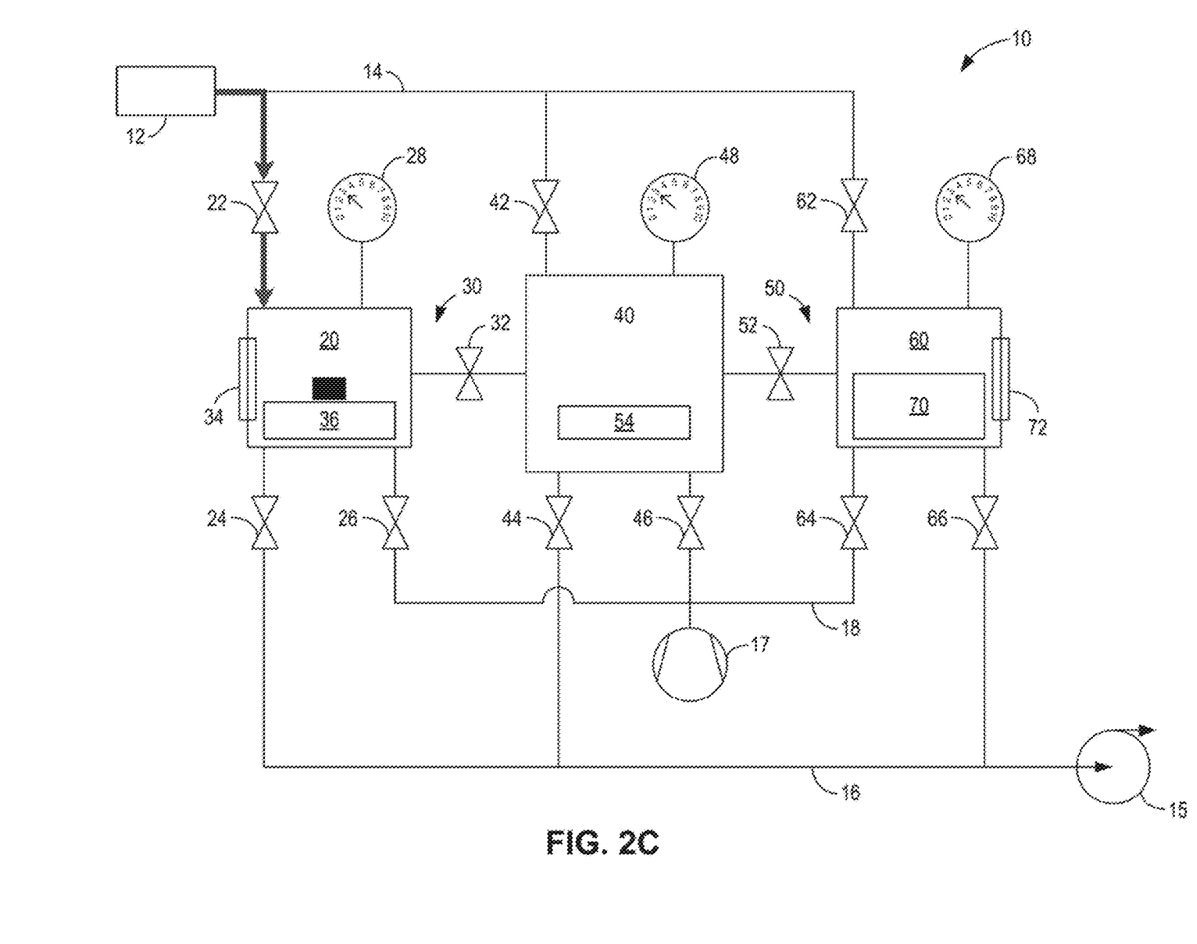
Figure 2D:
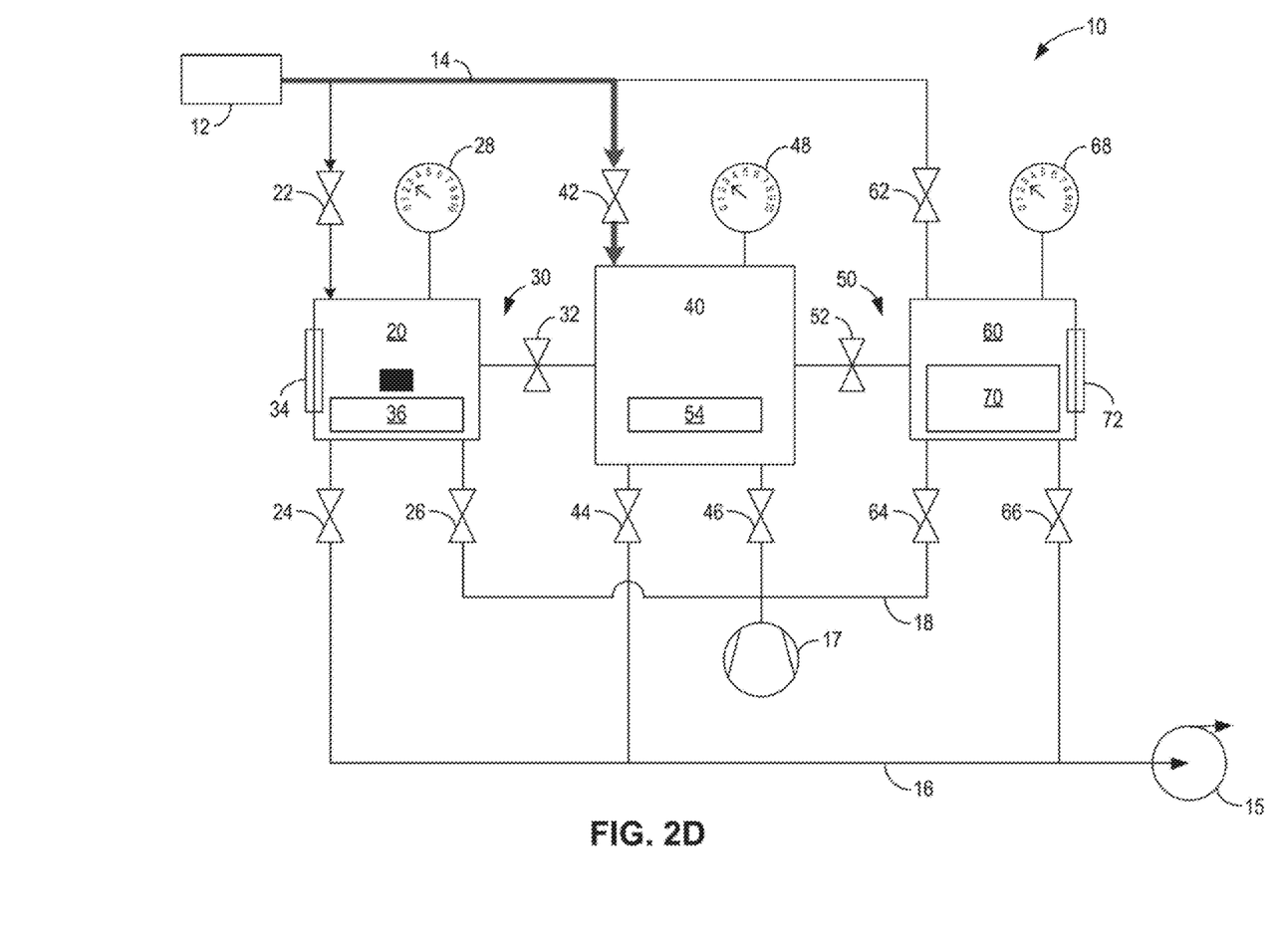
FIGS. 2D and 2E illustrate a first transfer process during which the solid material is transferred from the sample loading chamber to a process chamber of the gas-loading and packaging system.
Figure 2E:
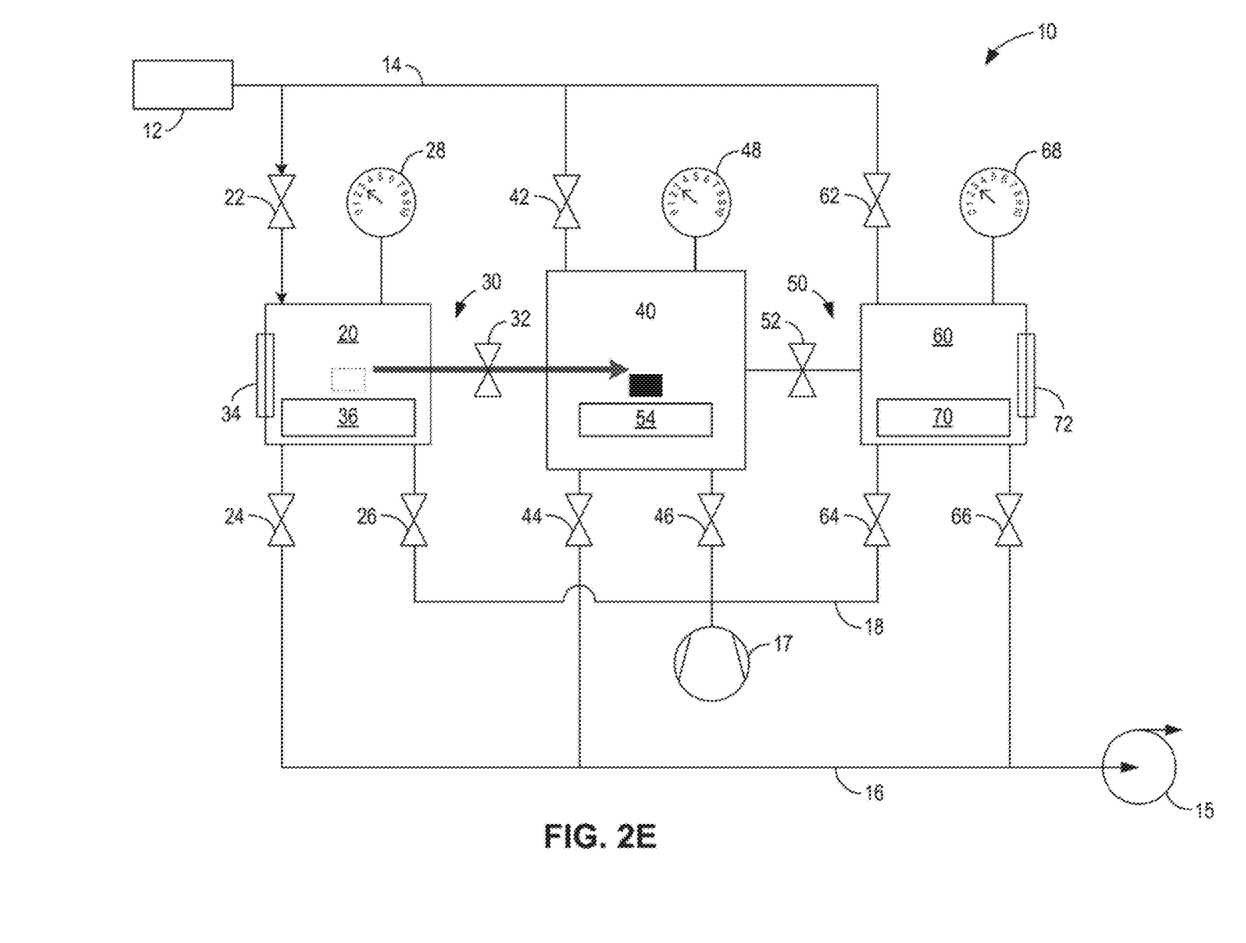
Figure 2F:
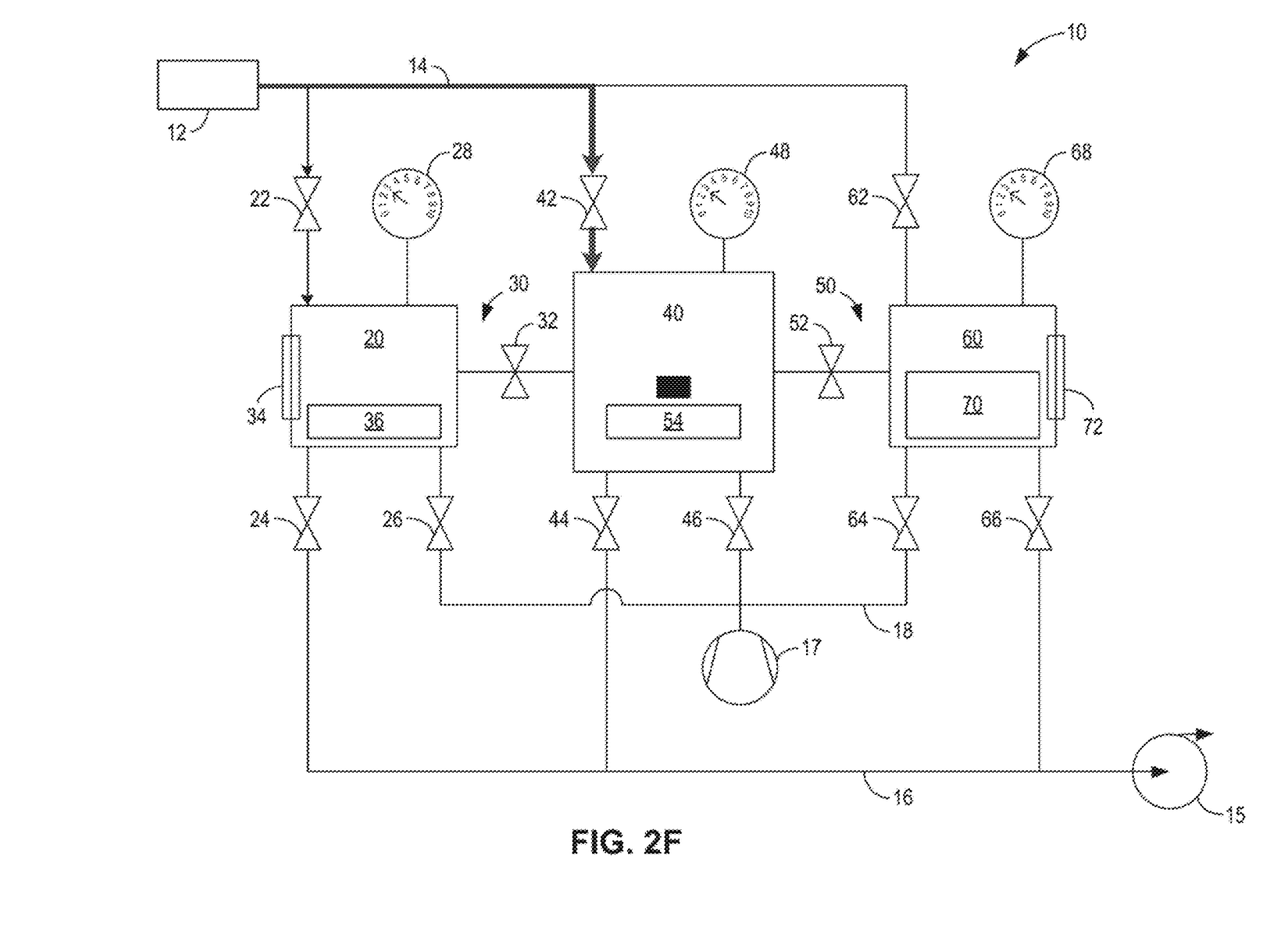
FIG. 2F illustrates a gas-loading process during which the solid material is loaded with hydrogen gas in the process chamber.
Figure 2G:
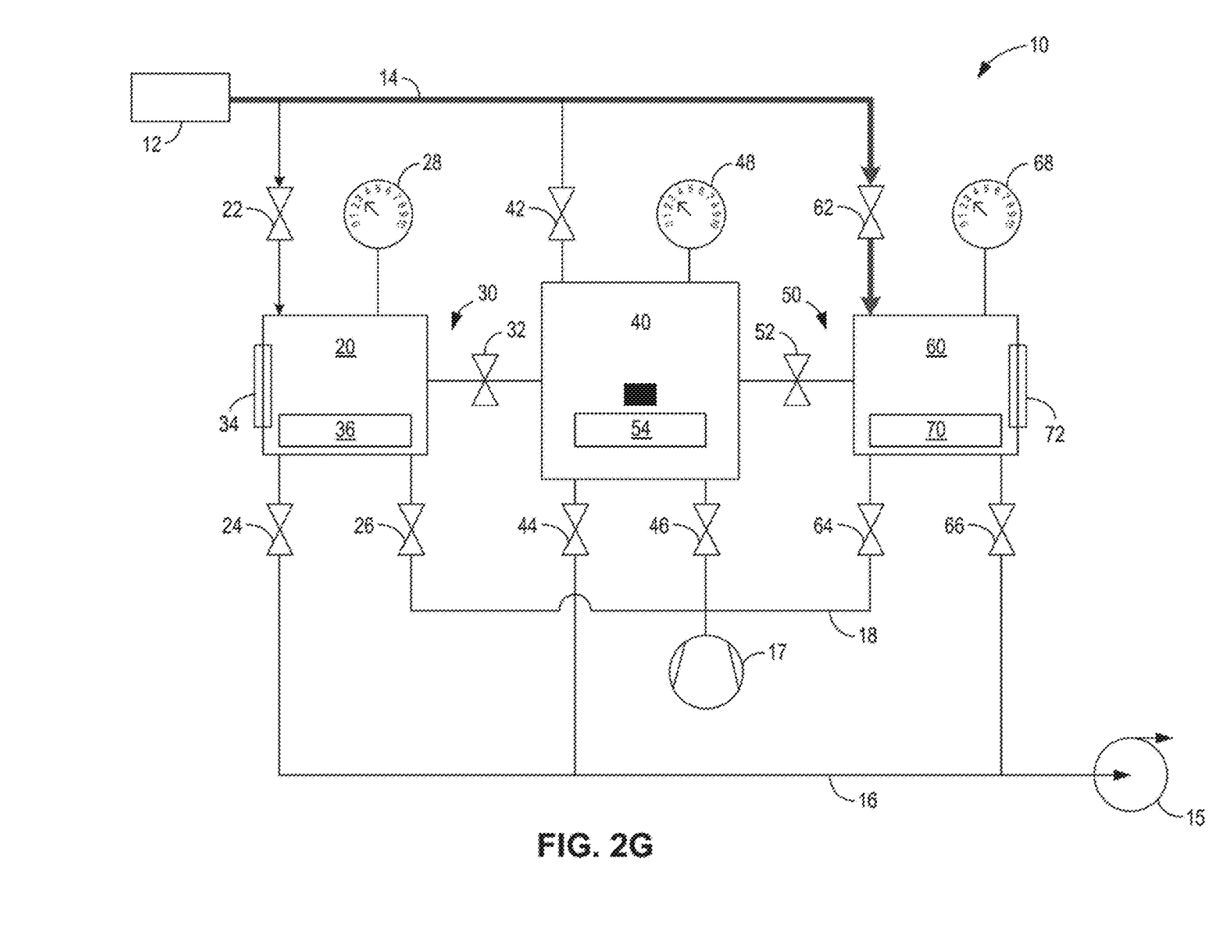
FIGS. 2G and 2H illustrate a second transfer process during which the solid material is transferred from the process chamber to a packaging chamber gas-loading and packaging system.
Figure 2H:
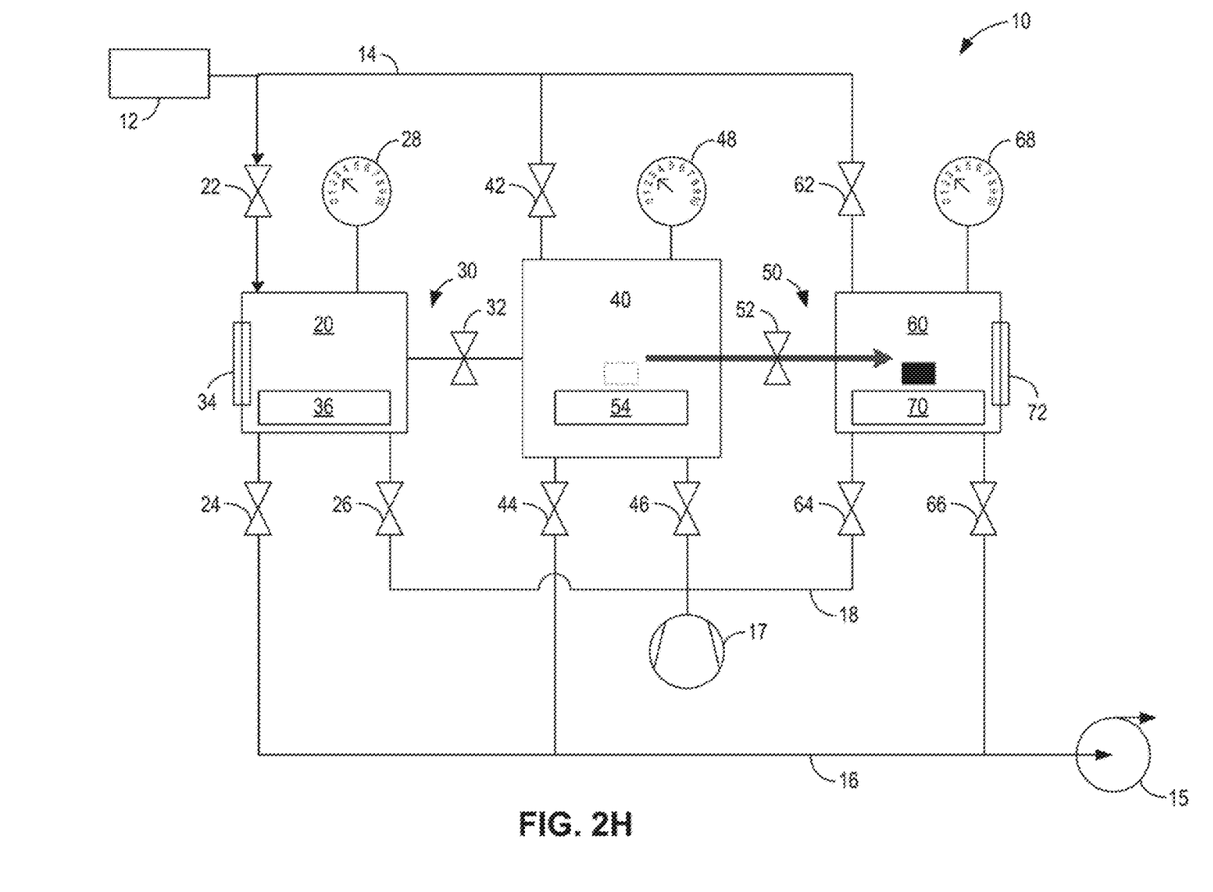
Figure 2I:
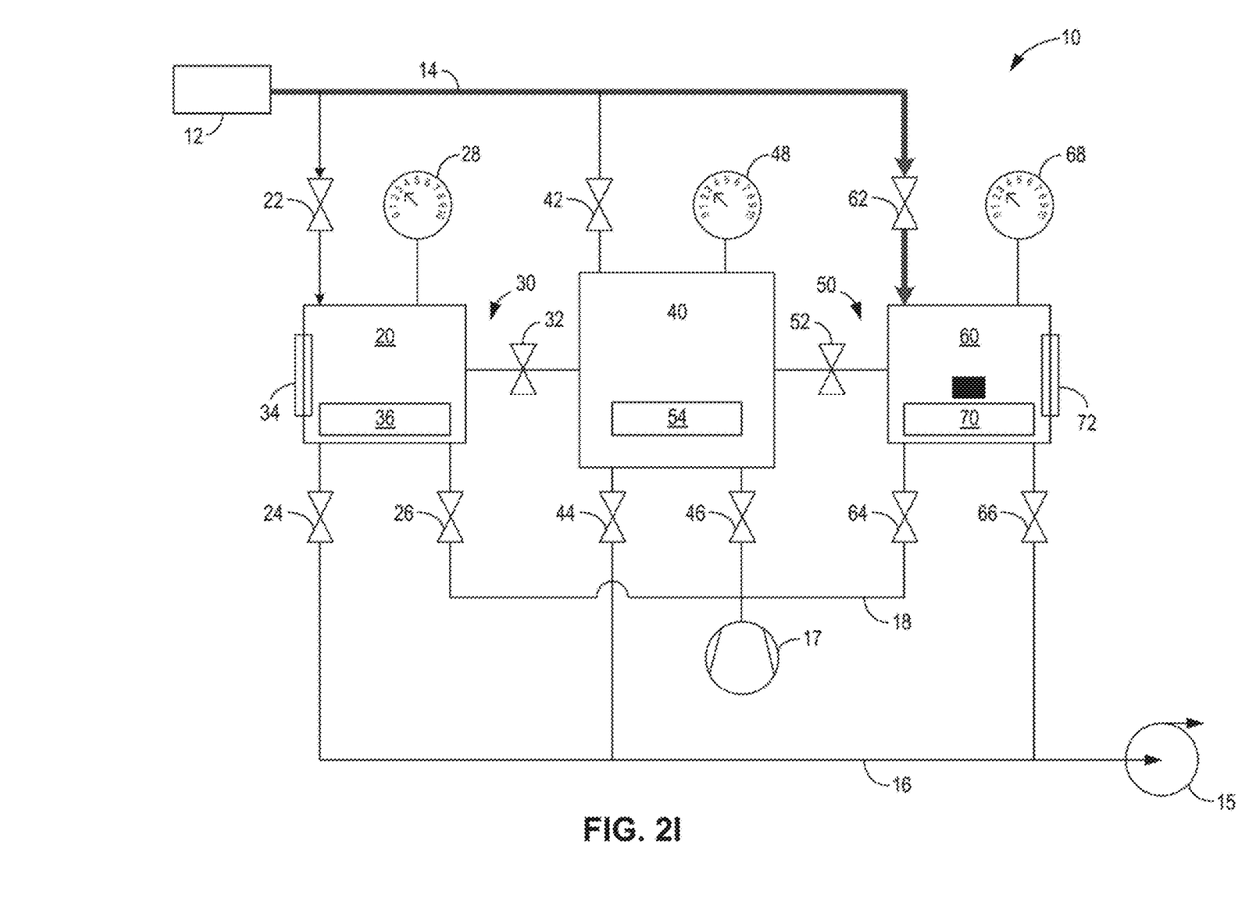
FIGS. 2I and 2J illustrate the packaging process during which the solid material is packaged into a sealed container.
Figure 2J:
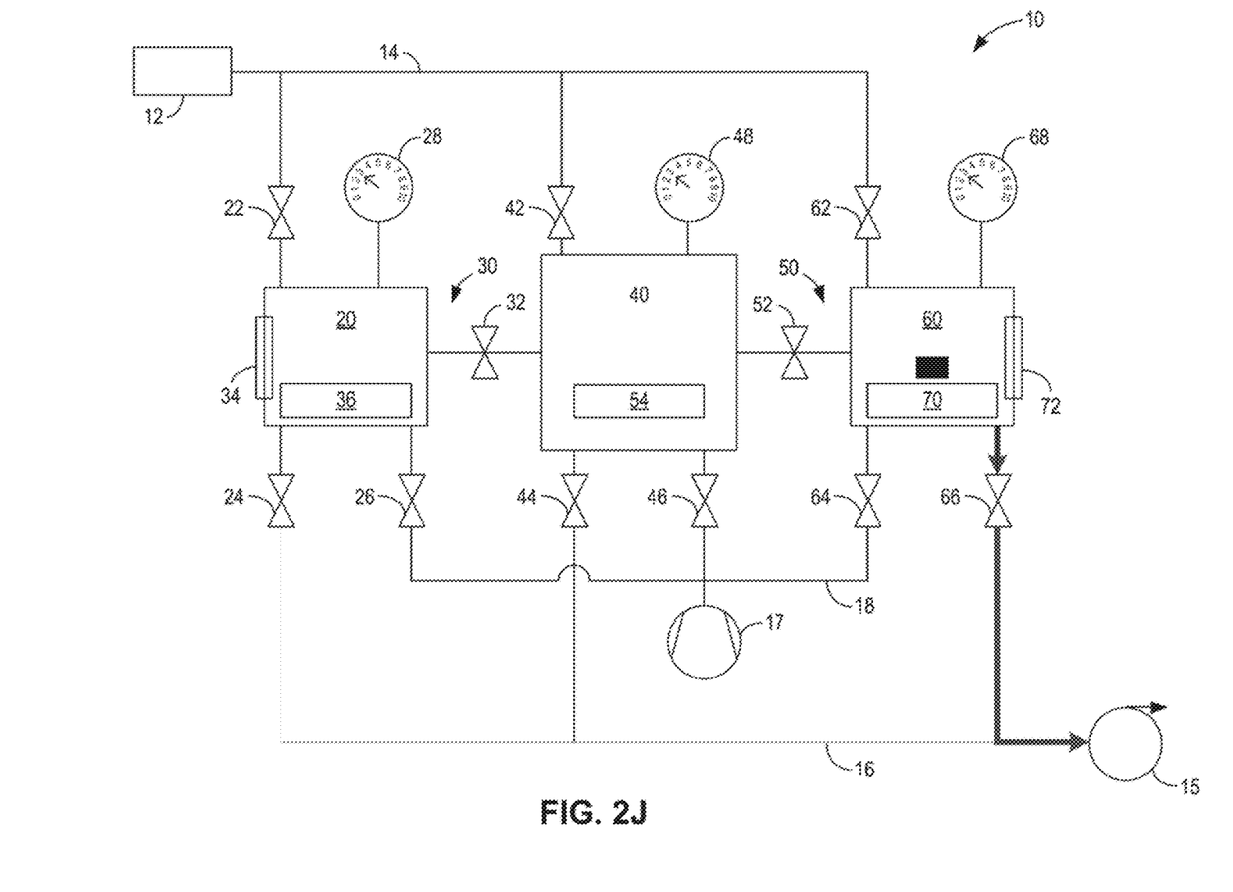

1. Load a solid material sample into the sample loading chamber and seal the sample loading chamber 20.
2. Open valve 24 to connect the sample loading chamber 20 to rough/backing pump 15 and begin evacuation of the sample loading chamber 20 as shown in FIG. 2A.
3. When the pressure level in sample loading chamber 20 reaches approximately 0.1 Torr (13 Pa), close valve 24 and open valve 26 to connect the sample loading chamber 20 to turbo-molecular pump 17 and continue evacuation of the sample loading chamber 20 as shown in FIG. 2B.
4. When the pressure level in sample loading chamber 20 reaches approximately $1\times10^{-6}$ Torr ($1\times10^{-4}$ Pa), close valve 26.
5. Open valve 22 to connect the sample loading chamber 20 to gas source 12 and fill the sample loading chamber 20 with the hydrogen gas as shown in FIG. 2C. The pressure inside the sample loading chamber 20 is measured by the pressure gauge 28.
6. Continue adding gas until the pressure in the sample loading chamber 20 reaches nominally 760 Torr (101 kPa), which is the working pressure of the sample loading chamber 20 reached. Shut off valve 22 when the pressure reaches the working pressure. This step ends the intake process.
7. Begin the first transfer process by opening valve 42 to add process gas to the process chamber 40 as shown in FIG. 2D. Continue adding hydrogen gas until the pressure inside the process chamber 40 reaches between 10 and 50 Torr (1.3 and 6.7 kPa) greater than the sample loading chamber pressure.
8. Close valve 42 and open gate valve 32 connecting the sample loading chamber 20 to the process chamber 40. The higher pressure level of the process chamber 40 relative to the sample loading chamber 20 serves to minimize the flow of any contaminants from the sample loading chamber 20 to the process chamber 40.
9. Transfer the solid material sample from the sample loading chamber 20 to the process chamber 40 and place the solid material sample on the scale 54 as shown in FIG. 2E.
10. Close gate valve 32 when the transfer of the solid material sample to the process chamber 40 is completed.
11. If it is desirable or required to increase the process gas pressure for adsorption on and absorption into the solid material sample, open valve 42 to increase the process gas pressure up to nominally 3800 Torr (507 kPa) to about 7600 Torr (1014 kPa) as shown in FIG. 2F. The sample will be loaded with hydrogen gas by absorption and adsorption. The amount of gas adsorbed and absorbed is calculated from the mass change measured by the scale after correcting for a change in chamber pressure.
12. During the gas-loading process, periodically measure the mass of the solid material sample and calculate the mass change of the solid material sample. Continue gas-loading until a desired amount of gas is added to the solid material sample. When the mass change and/or the solid material sample is loaded with a desired amount of gas, start the second transfer process to transfer the solid material sample to the packaging chamber 60.
13. To start the second transfer process, open valve 62 to supply gas to the process packaging chamber 60 as shown in FIG. 2G. Continue supplying gas to the packaging chamber 60 until the gas pressure in the packaging chamber 60, indicated by pressure gauge 68, is between 10 and 50 Torr (1.3 and 6.7 kPa) lower than the process chamber 40 pressure indicated by pressure gauge 48, at which time valve 62 is closed. The lower pressurization of the packaging chamber 60 relative to the process chamber 40 serves to minimize the flow of any contaminants from the packaging chamber 60 to the process chamber 40 since the packaging chamber 60 is opened to atmosphere to remove the sample.
14. Open gate valve 52 and transfer the solid material sample from the process chamber 40 to the packaging chamber 60 using the second linear transfer apparatus 70 as shown in FIG. 2H. When the transfer of the metal sample to the packaging chamber 60 is complete, close gate valve 52 to isolate the packaging chamber 60. This step ends the second transfer process.
15. In some cases, it may be desirable to increase the pressure in the packaging chamber 60 at the start of the packaging process. In this case, open valve 62 as shown in FIG. 2I to pressurize the packaging chamber 60 to a desired pressure level above the processing pressure to maintain the loading of the solid material sample.
16. Package solid material sample into a pressure sealed container. The packaging chamber 60 may be outfitted with vacuum/high pressure mechanical arms or other accessories as needed to transfer the solid material sample into a container that is capable of maintaining the process gas at the process pressure.
17. After sealing the container, open valve 66 to evacuate the packaging chamber 60 to atmospheric pressure, nominally 760 Torr (101 kPa) a shown in FIG. 2J.
18. Open the packaging chamber 60 and remove the packaged solid material sample. The packaging enables the solid material sample to maintain the incorporated gas—maximizing its usefulness in application and longevity.

Figure 3:
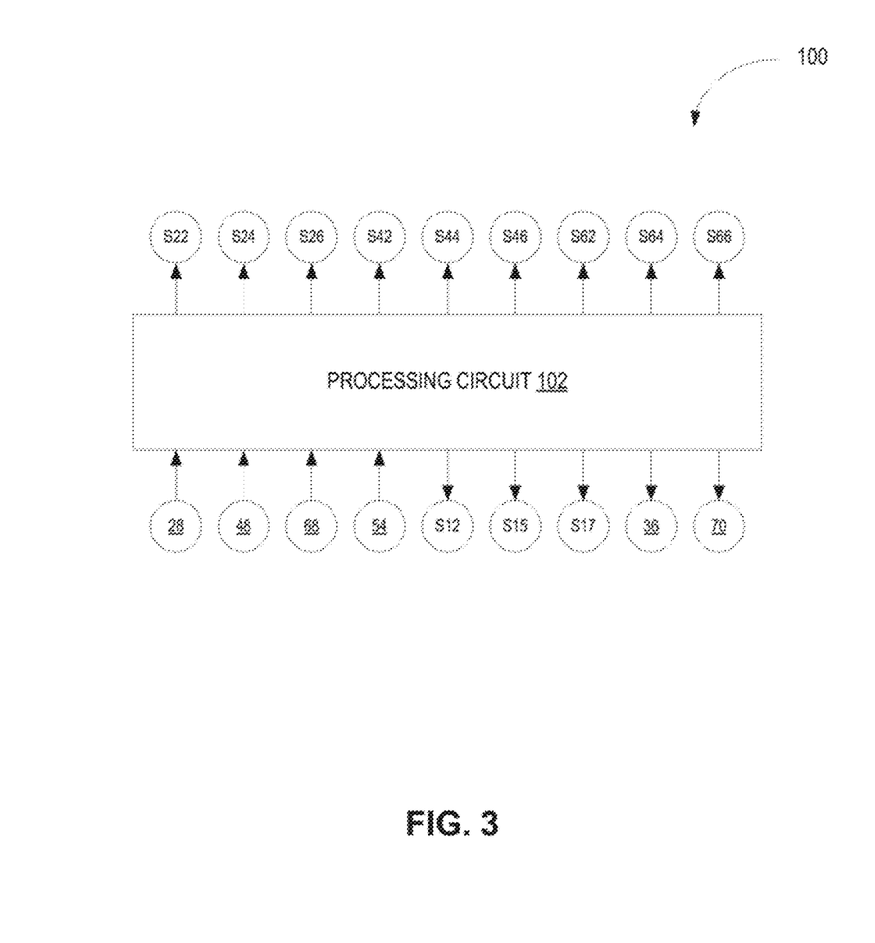
FIG. 3 illustrates an exemplary controller for controlling the gas loading and packaging system

FIG. 3 illustrates an exemplary control circuit 100 for controlling the operation of the gas loading and packaging system 10. The control circuit 100 comprises a processing circuit 102 that implements the main control functions of the gas loading and packaging system 10. The processing circuit 102 may comprise one or more processors, hardware circuits, firmware, of a combination thereof. The processing circuit 102 receives inputs from the pressure gauges 28, 48, and 68, and the scale 54 and outputs control signals to various solenoids and switches that control the valves as hereinabove described. Solenoids or switches S22, S24, S26, S42, S44, S46, S62,S64, and S66 control valves 22, 24, 26, 42, 44, 46, 62, 64, and 66 respectively. Solenoids or switches S32 and S52 control gate valves 32 and 52 respectively. Solenoids or switches S12, S15 and S17 control the gas source 12, rough/backing pump 15, and turbo-molecular pump 17 respectively. The processing circuit 102 may also send control signals to the linear transfer apparatus 36 and 70.

Figure 4A:
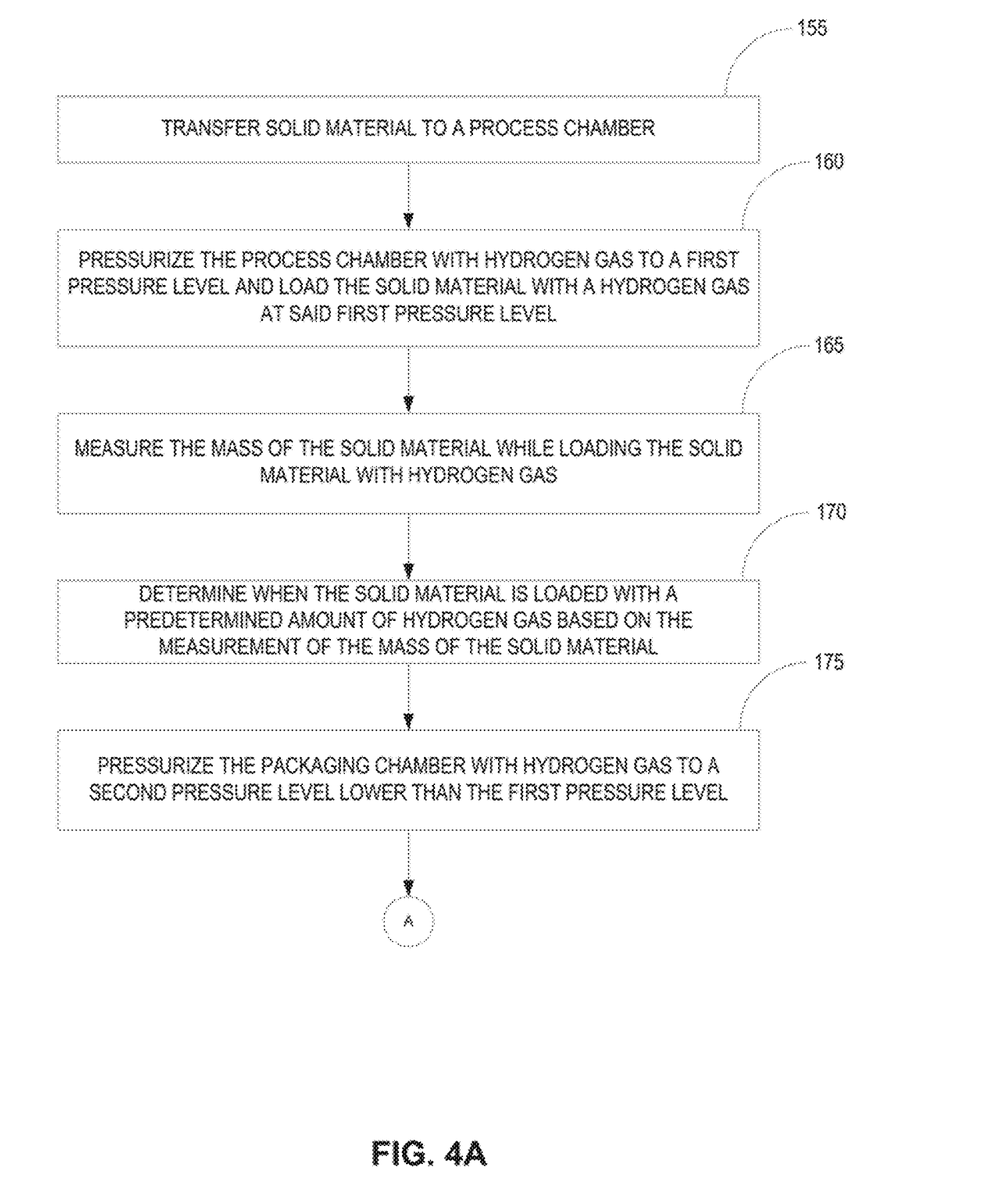
FIGS. 4A and 4B illustrate an exemplary method for gas-loading and packaging a solid material.
Figure 4B:
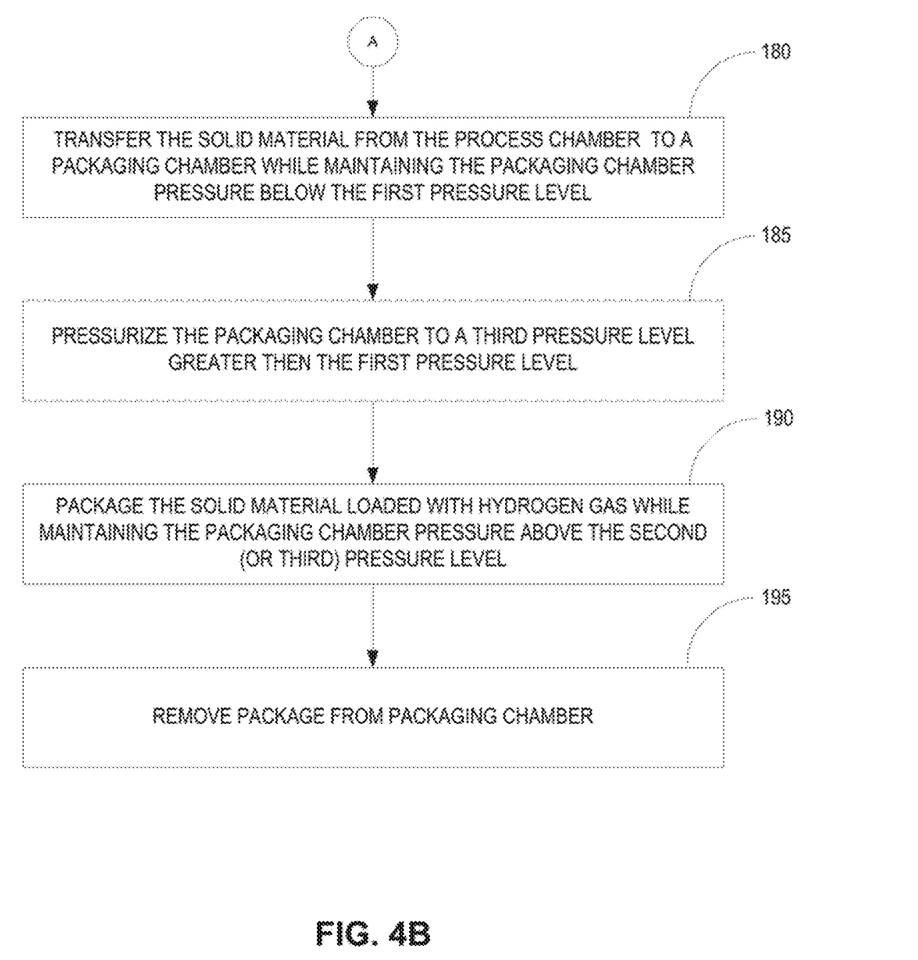

FIGS. 4A and 4B illustrate an exemplary method 150 of gas loading and packaging a solid material. The solid material is transferred to a process chamber 40 (block 155). Once the solid material is loaded in to the process chamber 40, the process chamber 40 is pressurized with hydrogen gas until the process chamber pressure reaches a first pressure level (block 160). The process chamber pressure is maintained above the first pressure level to load the solid material with hydrogen gas. While the solid material is being loaded with hydrogen gas, the mass of the solid material is measured and the measurements are used to determine when the solid material is loaded with a predetermined amount of hydrogen gas based (blocks 165 and 170). When the desired amount of hydrogen gas is loaded into the solid material, pressurize the packaging chamber 60 with hydrogen gas until the packaging chamber pressure reaches a second pressure level lower than the first predetermined pressure level and transfer the solid material from the process chamber to the packaging chamber (blocks 175 and 180) The solid material is then packaged in a sealed container while maintaining the packaging chamber pressure at or above second pressure level, after which the sample chamber is opened and the sealed container is removed from the packaging chamber 60 (blocks 190 and 195). In some embodiments, the packaging chamber pressure may be raised to a third pressure level higher than the first pressure level while the solid material is packaged (block 185).

What is claimed is:

1. A method of gas-loading and packaging a solid material, said method comprising:
    transferring the solid material to a process chamber;
    pressurizing the process chamber with hydrogen gas until and the process chamber pressure reaches a first pressure level and maintaining the process chamber pressure above the first pressure level to load the solid material with hydrogen gas;
    measuring the mass of the solid material while maintaining the process chamber pressure at or above the first pressure level;
    determining, based on the mass of the solid material, when the solid material is loaded with a predetermined amount of hydrogen gas;
    pressurizing a packaging chamber with hydrogen gas until the packaging chamber pressure reaches a second pressure level lower than the first pressure level;
    transferring the solid material from the process chamber to the packaging chamber while maintaining the packaging chamber pressure at or above the second pressure level and below the first pressure level;
    packaging the solid material in a sealed container while maintaining the packaging chamber pressure at or above second pressure level in the packaging chamber; and
    removing the sealed container with the solid material from the packaging chamber.

2. The method of claim 1 wherein transferring the solid material to a process chamber comprises:
    placing the solid material in a sample loading chamber;
    evacuating the loading chamber;
    pressurizing the sample loading chamber to a working pressure;
    pressurizing the process chamber until the process chamber pressure reaches an initial pressure level above the loading chamber pressure;
    after the process chamber is pressurized, transferring the solid material from the loading chamber to the process chamber.

3. The method of claim 2 wherein the initial pressure level of the process chamber comprises a pressure level sufficient to minimize the flow of contaminants from the loading chamber into the process chamber while the solid material is transferred to the process chamber.

4. The method of claim 2 wherein the initial pressure level comprises a pressure level of at least about 10 Torr above the loading chamber pressure.

5. The method of claim 2 wherein the initial pressure level comprises a pressure level in the range of about 10 Torr-50 Torr above the loading chamber pressure.

6. The method claim 2 wherein transferring the solid material from the loading chamber to the process chamber is performed by a linear transfer apparatus disposed in the loading chamber.

7. The method of claim 1 wherein the first pressure level comprises a pressure level of at least about 3800 Torr.

8. The method of claim 1 wherein the first pressure level comprises a pressure level in the range of about 3800 Torr to about 7600 Torr.

9. The method of claim 1 wherein, determining when the solid material is loaded with the predetermined amount of hydrogen gas comprises determining a change in mass of the solid material; and determining when the solid material is loaded with the predetermined amount of hydrogen gas based on the change in mass of the solid material.

10. The method of claim 9 wherein determining when the solid material is loaded with the predetermined amount of hydrogen gas based on the change in mass of the solid material comprises comparing the change in mass to a threshold.

11. The method of claim 9 wherein determining when the solid material is loaded with the predetermined amount of hydrogen gas based on the change in mass of the solid material comprises calculating the amount of hydrogen loaded into the solid material based on the change in mass.

12. The method of claim 2 wherein the second pressure level is sufficiently below the process chamber pressure to prevent the flow of contaminants from the packaging chamber into the process chamber while the solid material is transferred to the packaging chamber.

13. The method of claim 12 wherein the second pressure level comprises a pressure level of at least about 10 Torr below the loading chamber pressure.

14. The method of claim 13 wherein the second pressure level comprises a pressure level in the range of about 10 Torr to about 50 Torr below the loading chamber pressure.

15. The method of claim 1 wherein transferring the solid material from the process chamber to the packaging chamber is performed by a linear transfer apparatus disposed in said packaging chamber.

16. The method of claim 1 further comprising, after the solid material is transferred to the packaging chamber, pressurizing the packaging chamber to a third pressure level greater than the first pressure level; and maintaining the packaging chamber pressure at or above the third pressure level while the solid material is packaged in the sealed container.

* * * * *